July 30, 1935.　　　　J. V. CAPUTO　　　　2,009,873
WELDING ELECTRODE
Filed May 26, 1934　　　　5 Sheets-Sheet 1
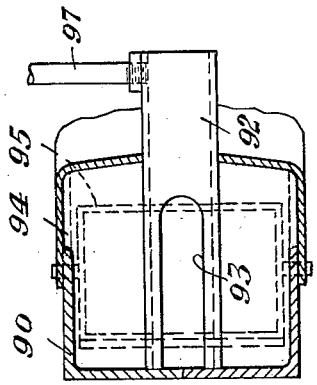
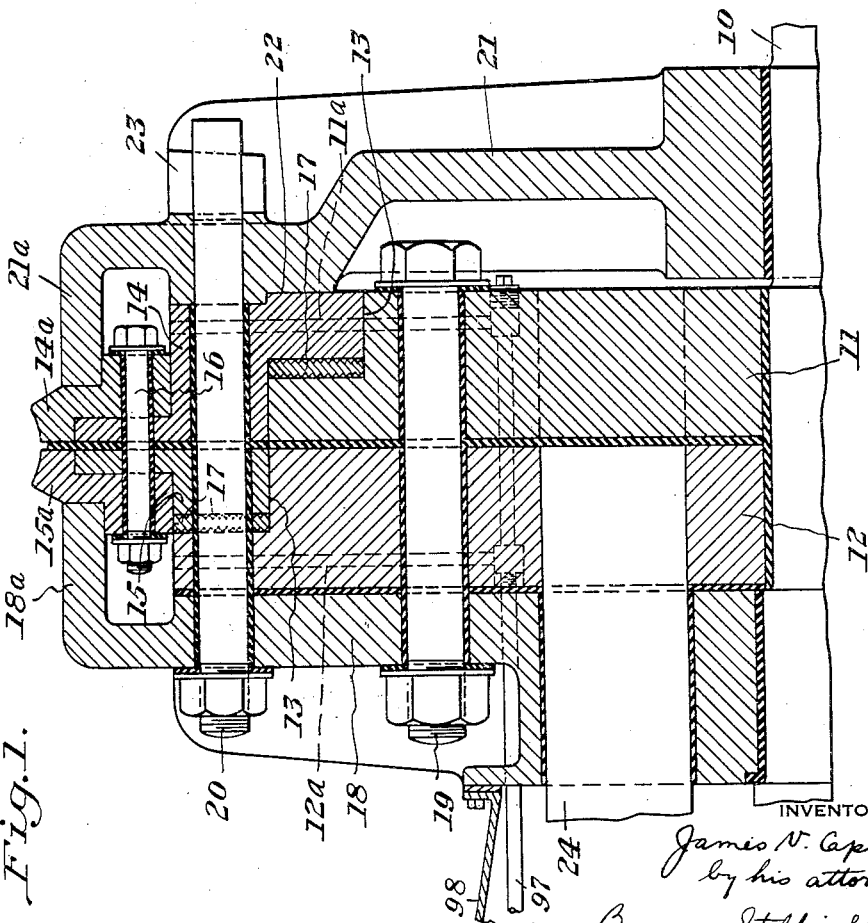

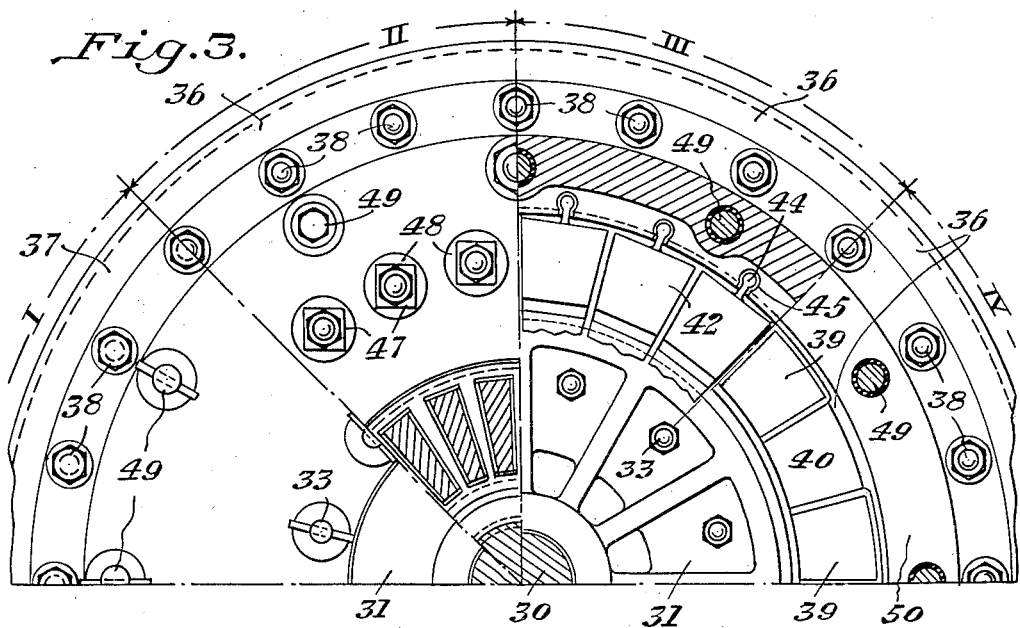
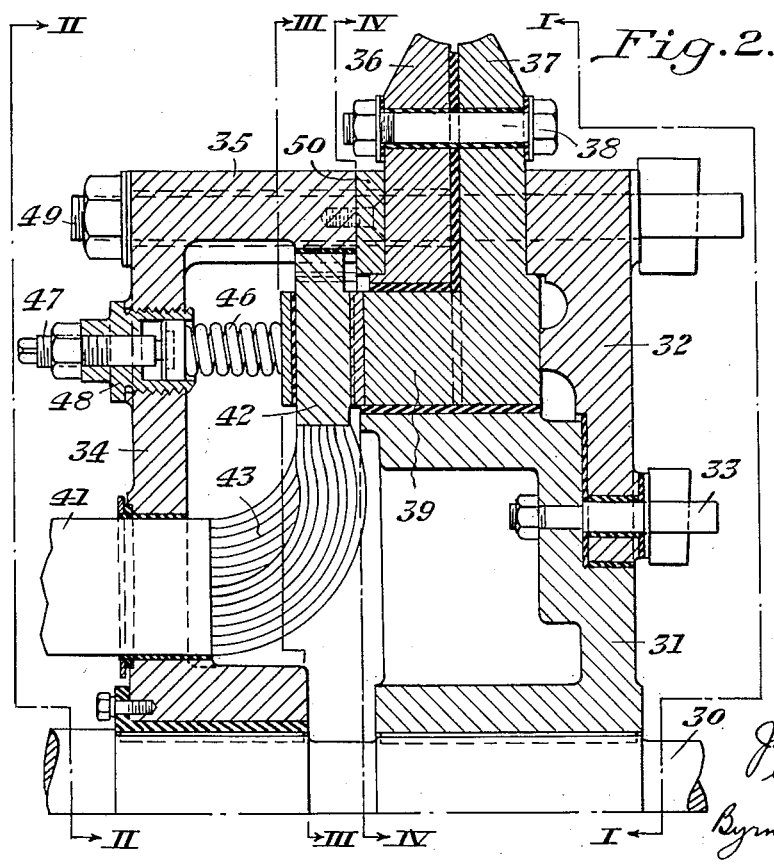

July 30, 1935.   J. V. CAPUTO   2,009,873
WELDING ELECTRODE
Filed May 26, 1934   5 Sheets-Sheet 3
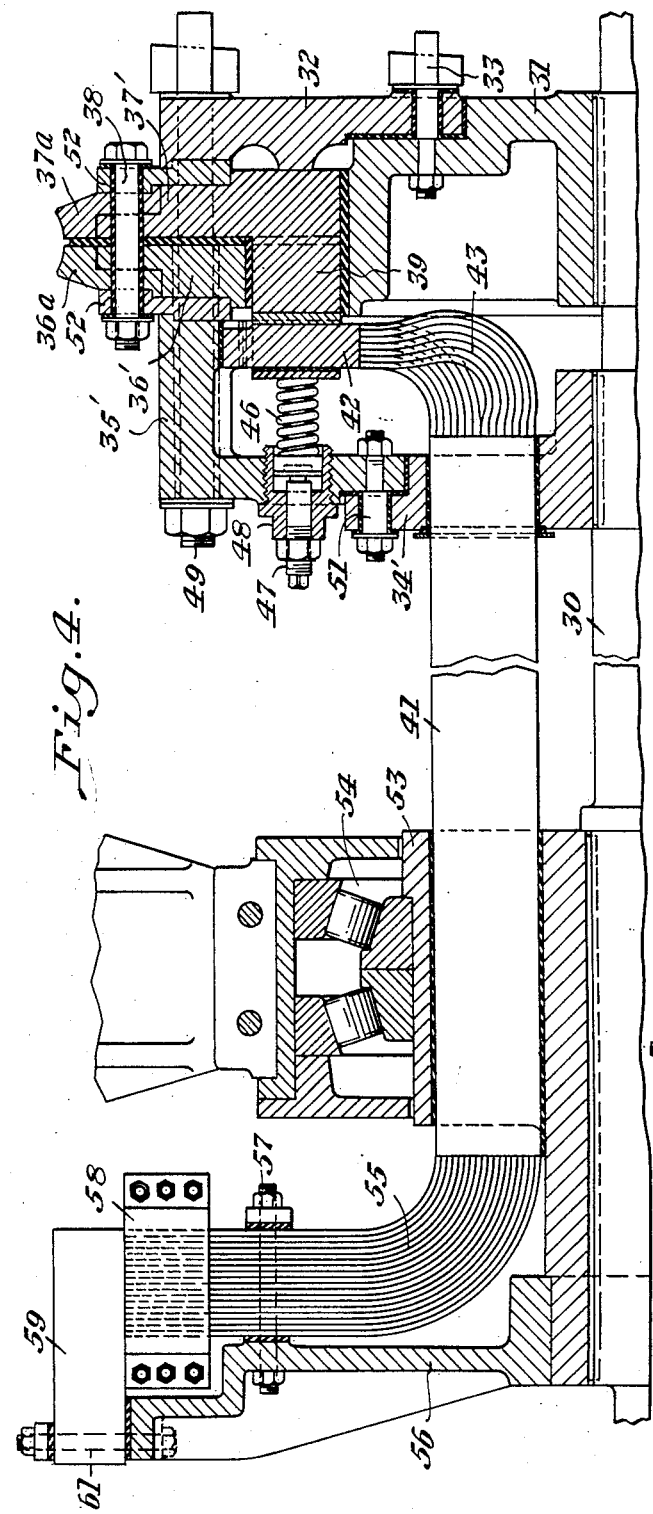
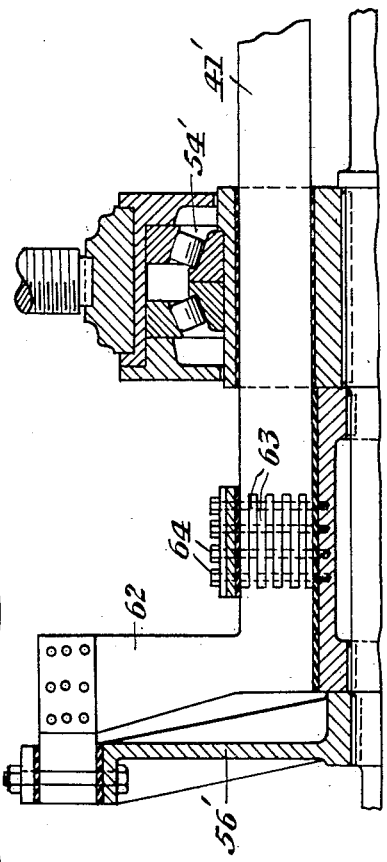
INVENTOR
James V. Caputo
by his attorneys
Byrnes, Stebbins & Blenko July 30, 1935.   J. V. CAPUTO   2,009,873
WELDING ELECTRODE
Filed May 26, 1934    5 Sheets-Sheet 4

INVENTOR
James V. Caputo
by his attorneys
Byrnes, Stebbins & Blenko

July 30, 1935.  J. V. CAPUTO  2,009,873
WELDING ELECTRODE
Filed May 26, 1934  5 Sheets-Sheet 5
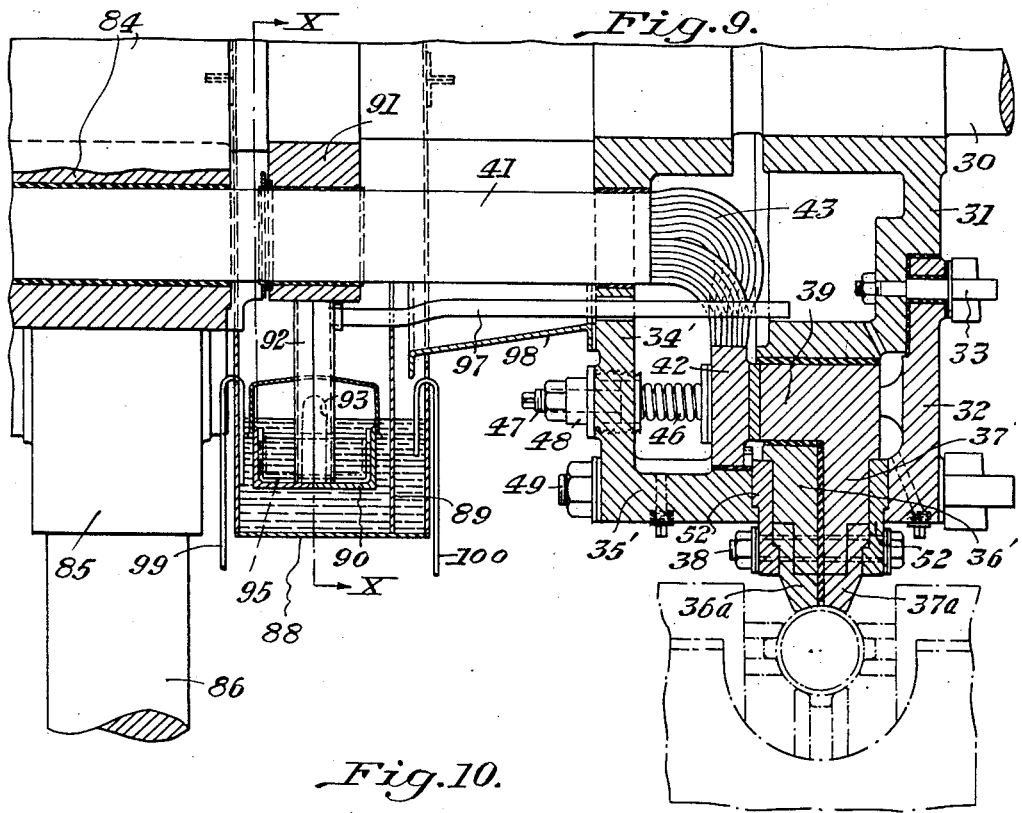
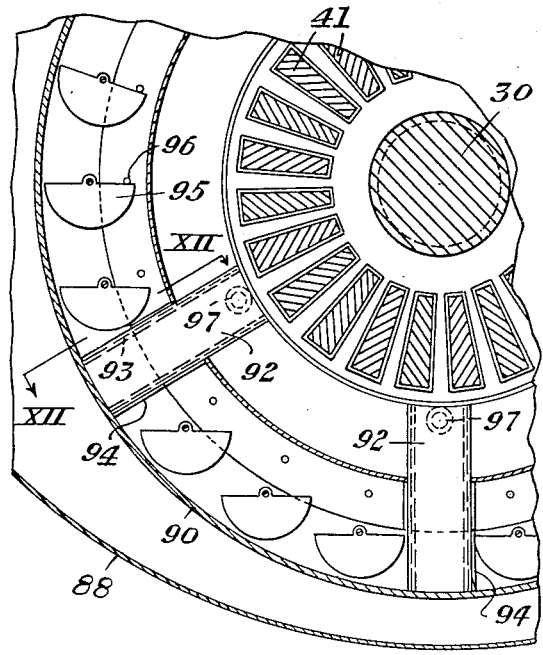
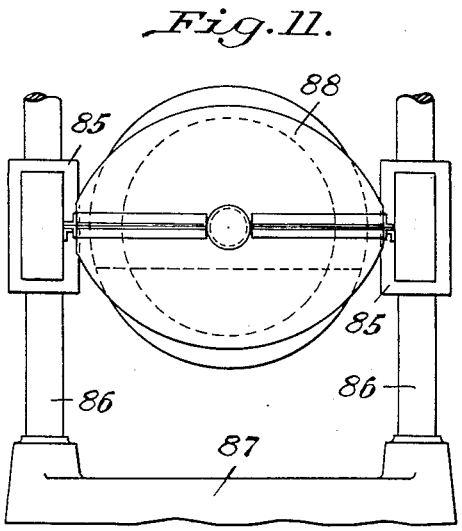
INVENTOR
James V. Caputo
by his attorneys
Byrnes, Stebbins & Blenko Patented July 30, 1935

2,009,873

UNITED STATES PATENT OFFICE 2,009,873

WELDING ELECTRODE

James V. Caputo, Crafton, Pa.

Application May 26, 1934, Serial No. 727,705

21 Claims. (Cl. 219—4)

My invention relates to electric welding and, in particular, to a rotary electrode for supplying welding current to the edges of a seam for the progressive welding thereof.

In welding large sizes of pipe, for example, having a considerable wall thickness, or in welding together any plate edges of substantial thickness, the amount of current must be large if the welding is to be accomplished rapidly. The delivery of large currents to the work presents special problems not encountered in the welding of thinner gauges of material where the currents involved are much smaller. Ordinarily, the current must be delivered to the electrode from a nearby source, such as a generator, by means of large conductors. Obviously, these conductors must be connected tightly to the electrode if excessive contact losses are to be avoided. It is desirable at times, however, to replace or renew a welding electrode and, for that reason, it is necessary to have the connections between the electrode and the supply conductors arranged for ready separation. These two characteristics are, of course, contrary and inconsistent and have not heretofore been obtained in any construction with which I am familiar.

It has been impossible, furthermore, in previous types of welding electrodes, to obtain sufficient mechanical strength unless the dimensions were such as to make the electrode objectionable because of size, weight, and cost. No solution has been proposed heretofore for the problem of providing an electrode with a removable shoe which, when in place, would have an ohmic drop substantially equal to that of a solid member of the same dimensions. The joints between such removable shoes and their supports, furthermore, have been always subject to the full working pressure so that poor connections resulted, increasing the resistance and heating effect. My invention satisfactorily overcomes these limitations characteristic of welding electrodes as previously known.

In accordance with my invention, I provide a welding electrode having work-engaging or contact portions which can be readily removed from the remainder of the structure. At the same time, I provide means for insuring a firm contact between the electrode and the conductors supplying current thereto. I provide electrode rims supported on a shaft for rotation therewith by means of cup-shaped members including means for exerting a pressure tending to force conductor terminals against portions of the electrode rims to establish a firm contact therewith. Since the supply conductor terminals engage the electrode rims flatwise only, no special provisions are necessary to separate the rims from the terminals.

For a complete understanding of the invention, reference is made to the accompanying drawings illustrating certain embodiments thereof. In the drawings:

Figure 1 is a half radial section through one form of the invention;

Figure 2 is a similar view showing a modified form of construction;

Figure 3 is a composite sectional view, the planes of several portions of which are indicated by corresponding sectional lines on Figure 2;

Figure 4 is a view similar to Figure 1 of a further form of the invention showing the arrangement of the supply conductors extending from the electrode;

Figure 7 is a view similar in part to Figure 4, showing an alternate construction;

Figure 9 shows a construction similar to that of Figure 4 provided with means for cooling the portions of the electrode which are apt to become heated in operation;

Figure 10 is a sectional view along the line X—X of Figure 9;

Figure 11 is an end view showing the apparatus of Figure 9 in outline; and

Figure 12 is a sectional view along the line XII—XII of Figure 10.

Figure 8:
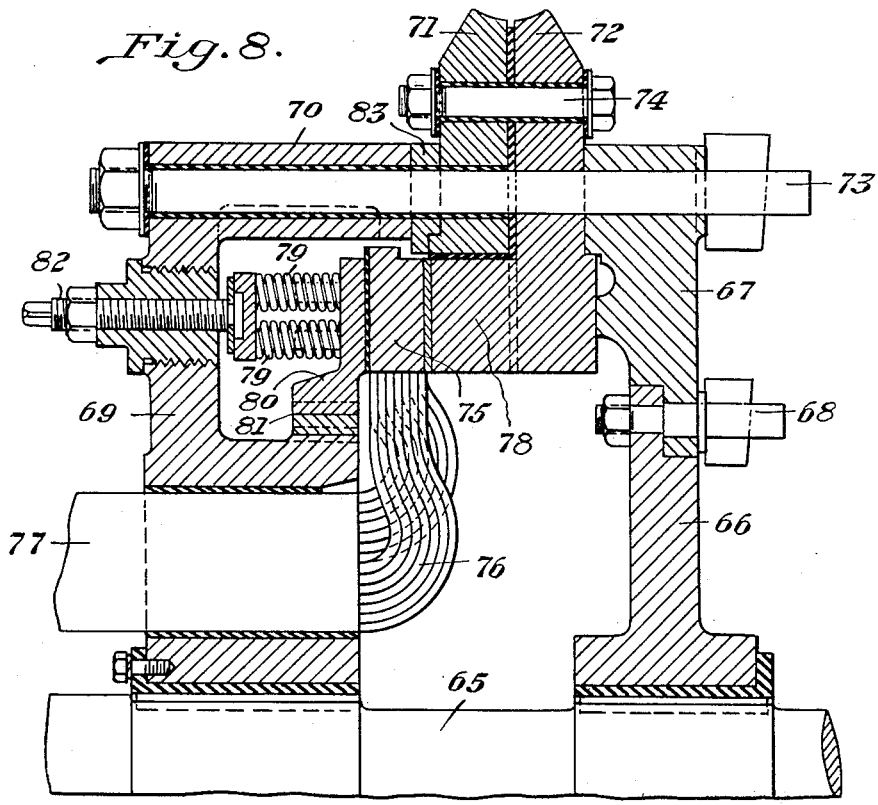
Figure 8 is a view similar to Figure 1 showing a still further modified form of construction.
Figure 5:
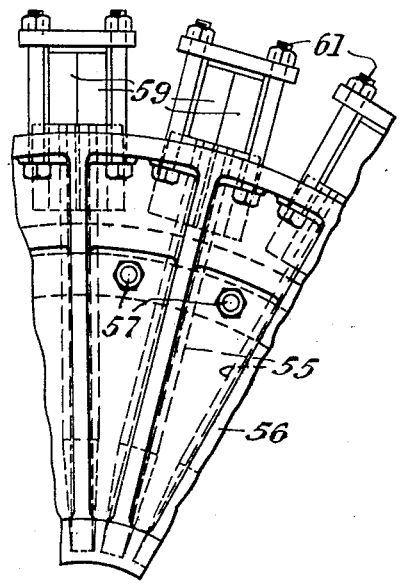
Figure 5 is a partial end elevation of the left-hand end of Figure 4.

Referring now in detail to the drawings and for the present to Figure 1, a supporting shaft 10 is mounted in suitable bearings for rotation and preferably means will be provided for driving the shaft, although such are not shown herein. Electrode discs 11 and 12 are mounted on the shaft and insulated therefrom and from each other. The discs 11 and 12 have shoulders 13 adjacent their peripheries which are adapted to receive contact rims 14 and 15 shaped conformably. Removable shoes 14a and 15a are carried by the rim. The rims are insulated from each other and are secured together by bolts 16. It will be obvious that the sides of the rims 14 and 15 have flat engagement with the shouldered edges of the discs 11 and 12 and are movable as a unit axially thereof. In order to insure a good contact, I provide grooved rings 17 between the adjacent surfaces of the discs and rims. The ridges of the rings 17 bite into the discs and rims and insure good contact therebetween. The rings themselves may be plated with a highly conductive metal such as silver.

A collar 18 having a flange 18a is keyed to the shaft 10 and insulated therefrom. Bolts 19 extending therethrough secure the discs 11 and 12 to the collar. The bolts are insulated from the discs and the collar. The rims 14 and 15 are secured to the discs by bolts 20 and a collar 21 having a flange 21a, mounted on the shaft 10. The collar 21 has an offset peripheral portion 22 engaging the rim 14 flatwise and forcing it and the rim 15 into firm engagement with the rings 17 between the rims and the discs. The flanges 18a and 21a constitute the principal support laterally and radially for the shoes 14a and 15a, and the rims 14 and 15. Instead of heads, the bolts 20 are provided with removable keys 23 to facilitate change or renewal of the rims 14, 15. The right-hand end of the shaft 10 is supported in a movable bearing, the other end of the shaft 10 being supported by bearings to the left of the electrode as shown in Figure 1. By knocking out the keys 23, the flange 21 may be pulled off the end of the shaft 10 after the removal of the supporting bearing, and the rims 14, 15 likewise.

It will be obvious that the flanges 18a and 21a not only support the shoes laterally against forces tending to deform them, but also, because the flanges engage shoulders on the shoes, hold the latter in close contact radially with the rims to constitute a joint having very low electrical resistance.

Passages 11a and 12a extend radially of the discs 11 and 12 and rim 14, to permit the flow of a coolant to and from the interior of the electrode, as will be described hereafter in greater detail by reference to Figure 9.

Current is supplied to the discs 11 and 12 by conductors 24 disposed circumferentially about the shaft 10. All the conductors are insulated from the collar 18. Alternate conductors extend into suitably shaped holes in the disc 12 and make electrical contact therewith, as shown in solid lines in Figure 1. This construction is also shown in my copending application Serial No. 659,532. The other conductors extend through holes in the disc 12 and are insulated therefrom but fit into holes in the disc 11 and make electrical contact therewith in the same manner as the alternate conductors, as shown in dotted lines in Figure 1, by being brazed or welded thereto.

It will be apparent that the construction of Figure 1 provides an electrode in which the discs and rims are firmly braced laterally and radially but which, at the same time, permits ready removal of the rims from the discs.

Figures 2 and 3 illustrate an electrode construction according to which the discs 11 and 12 shown in Figure 1 are eliminated and the rims supported exclusively by bracing members carried on a shaft, electrical connections being made to the rims by conductor terminals abutting squarely thereagainst. In Figure 2, a shaft 30 carries a hub 31. A collar 32 is mounted in a shoulder on the hub and is secured thereto by bolts 33. The collar 32 is insulated from the hub 31 and the bolts 33. A hub 34 is also mounted on the shaft 30 and is spaced axially therealong from the hub 31. The hub 34 has a flange 35 extending axially thereof toward the hub 31. The hub 34 is insulated from the shaft 30.

Contact rims 36 and 37 are disposed between the collar 32 and the flange 35 and surround the hub 31. The rims constitute a unitary structure being held together by bolts 38 although separated by insulation. The rim 36 has slots in its inner periphery adapted to receive projections 39 formed integral with the rim 37. The inner periphery of the assembled rims is thus formed by a series of alternating projections as shown in Figure 3. The projections 39 are insulated from the intermediate projecting portions of the rim 36 indicated at 40.

Supply conductors 41 extend along the shaft 30 and through suitable holes in the hub 34, being insulated therefrom. The conductors 41 have terminals 42 connected thereto by flexible leads 43. As shown in Figure 3 the terminals 42 are simply blocks, each block having a dowel head 44 adapted to be received in a slot 45 formed in the inner periphery of the flange 35. A layer of insulating material is disposed between the heads and the slots. As an alternate, the heads may be separate from the blocks, secured thereto and insulated therefrom.

Terminal springs 46 are carried on the hub 34 for urging the terminals 42 into engagement with the projections 39 and 40. The pressure exerted by the springs 46 may be varied by means of back-up screws 47 which are threaded into sleeves 48 disposed in a circle about the hub 34. The springs 46 are insulated from the terminals 42. The entire assembly of hubs 31 and 34, the collar 32, and the rims 36, 37, is secured together by bolts 49 having keys therein. When it is desired to remove the rims 36, 37, it is only necessary to remove the keys from the bolts 33 and 49. The collar 32 and the rims 36 and 37 may then be removed over the right-hand end of the shaft 30. The terminals 42, of course, tend to follow the rims as the latter move axially but are arrested by engagement with the hub 31 and a ring 50 bolted to the face of the flange 35.

To replace the rims of the structure of Figures 2 and 3, as well as that of Figure 1, the nuts are removed from the securing bolts and the keys are replaced therein. The bolts are passed through the collar, rims and flange when the latter have been re-assembled. Turning down the nuts on the bolts then draws the entire assembly tightly together.

Figure 4 illustrates an electrode similar in general to that of Figures 2 and 3, as well as the supply conductors leading thereto. The electrode of Figure 4 differs from that of Figures 2 and 3 in that the rims 36' and 37' of the former have removable shoes 36a and 37a. In case of wear or injury, these shoes can be replaced without the necessity of replacing the entire rims. This feature, of course, may also be incorporated in the other forms of the invention shown herein. The flange 35' of the electrode of Figure 4 is removably mounted on the hub 34' thereof by means of bolts 51. The rims 36' and 37' and their shoes 36a and 37a, furthermore, are enclosed within shrouds 52 which further support and reinforce the conducting portions of the electrode against lateral or radial deformation. The shrouds are the supporting members for the shoes and hold the shoes in firm contact axially and radially and keep them from becoming eccentric and, furthermore, transmit the mechanical pressure from the shoes to the shaft through the flange 35' and hub 34'. Since the shrouds 52 are in electrical conducting engagement with the rims and the flange 35', the latter is insulated from the hub 34 and the connecting bolts 51. The other portions of the electrode of Figure 4 are similar to corresponding parts of that of Figures 2 and 3 and are similarly numbered. The flange 35', the shrouds 52 and the shoes 36a and 37a, have cooperating shoulders whereby the shoes are held in against forces tending to distort them outward radially.

Figure 6:
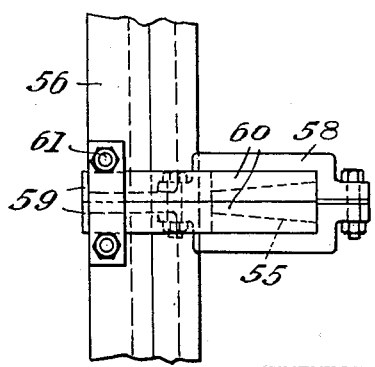
Figure 6 is a partial plan view showing a detail of the structure of Figure 4.

The conductors 41 extending axially of the electrode pass through a sleeve 53 and are insulated therefrom and from each other. The sleeve 53 carries the inner race of a roller bearing 54, the outer race of which is carried in a fixed support. Beyond the bearing 54, the conductors 41 are provided with flexible leads 55 secured to arms 56 on the shaft 30 by bolts 57. The flexible leads 55 extend between clamping brackets 58, as shown in Figure 6. Terminals 59 also carried on the arms 56 have depending portions 60 extending from between the ends of the leads 55 and the inner faces of the clamping brackets 58. The terminals 59 are secured to the flange 56 by bolts 61. The terminals 59 are adapted to have welded thereto supply conductors which extend on to a current source.

Figure 7 illustrates a slightly different form of connection between the conductors extending axially from the electrode along the shaft and the terminals disposed radially of the shaft. In Figure 7, one of the conductors is shown at 41' and extends through a bearing 54' similar to that of Figure 4. Radial arms 56' carried on the shaft are provided with radially disposed terminals 62. The terminals 62 and the conductors 41' have interfitting end slots 63 forming a laminated connection secured together by bolts 64 on opposite sides of the conductor. This construction provides a rigid but separable connection between the outgoing terminals and the conductors extending from the electrode.

Figure 8 illustrates an electrode which is similar in general to that of Figure 2. In Figure 8, a shaft 65 carries a flange 66 having a collar 67 removably secured thereto by bolts 68. The flange 66 is insulated from the shaft. A hub 69 also carried on the shaft has a flange 70. Electrode rims 71 and 72 are disposed between the collar 67 and the flange 70 and are similar to the rims 36 and 37 of Figure 2. The flange 70 and collar 67 may have portions engaging the rims 71 and 72 as shown in Figure 1. Bolts 73 hold the assembly together, the rims being secured to each other by bolts 74. Terminal blocks 75 connected to flexible leads 76 extending radially from conductors 77 are forced into engagement with alternating projections 78 from the rims 71 and 72, by springs 79. The springs engage a plate 80 having a tongue and groove fitting 81 with the inner portion of the hub 69, and support the terminal blocks 75. The springs 79 are backed up by screws 82, as shown in Figure 2. On removal of the rims in the manner already explained, the terminal blocks are arrested by engaging the inner periphery of a plate 83 secured to the face of the flange 70.

Figures 9 through 12 illustrate a system for cooling an electrode, such as those shown in Figures 1, 2 and 4. The details of the electrode construction will be identified by the same numerals as in Figure 4. As shown in Figure 9 and Figure 11, the shaft 30 and conductors 41 are supported for rotation in a bearing 84 mounted in a carriage 85 adjustable vertically on columns 86 rising from a base 87. Between the electrode and the bearing, an annular housing 88 surrounds the shaft 30. The housing is divided into two chambers by a partition 89. A bucket wheel 90 is carried on a hub 91 on shaft 30 for rotation in the housing 88. The rim of the wheel 90 is a hollow annulus, as shown in Figure 9, with radial spokes 92 extending therefrom to the hub. The spokes are hollow passages. On one side of each of the hollow spokes, an opening 93 is formed. On the other side, radial partitions 94 shown in Figure 12, divide the wheel rim into a plurality of chambers. Buckets 95 are pivoted to the wheel rim and are adapted to be tilted on engagement with pins 96 as shown in Figure 10, extending inwardly from the wall of the hollow wheel rim 90. The housing 88 is filled with a coolant, such as oil, to the level as indicated in the dotted line in Figure 11. The hollow wheel rim 90 is not fluid-tight and as it dips into the oil on rotation of the shaft 30, the buckets 95 are filled. As the buckets rise, they are gradually tilted by engaging the pins 96 and dump their contents. Because of the dividing partition walls 94 between adjacent segments of the interior of the hollow wheel rim 90, the oil flows through the holes 93 into the hollow spokes 92. Ducts 97 extend axially from the spokes 92 into the interior of the electrode. Cooling oil obviously flows through the ducts 97 on the rising side of the apparatus into the electrode and has intimate contact with the portions thereof which are apt to become heated in operation. After flowing over the interior surfaces of the electrode, the oil returns with continued rotation of the apparatus to a return trough 98 through the space about the ducts 97 where they pass through the hub 34. The returning oil is thus delivered to the right-hand chamber of the housing 88. It may be removed therefrom for cooling and redelivery to the left-hand chamber of the housing by any convenient piping system including supply pipes extending into the two chambers as indicated at 99 and 100 in Figure 9. Suitable drain plugs may be provided in the electrode construction to remove oil accumulated therein when it is desired to change the rims.

Figure 9 also illustrates in connection with the electrode, a pressure roll stand for welding tubes from formed blanks. Obviously, this is only one application of the invention disclosed herein.

It will be apparent from the foregoing description that the novel electrode construction of my invention is characterized by numerous advantages over electrodes known heretofore. Among these may be mentioned the strong and rigid lateral support provided for the electrode rims at points adjacent their peripheries, the easy removability of the rims for repair or replacement, and the positive connections afforded at all times between the supply conductor terminals and the electrode rims, such connections being readily detachable. The arrangement of flanged collars engaging the rims and shoes transmits the working stresses imposed on the latter to the shaft directly without affecting the electrical connection. By this arrangement, the joints in the conducting members are not subjected to any substantial mechanical stress and this prevents the contact joints from being adversely affected. The joints are free to move slightly under expansion of the parts without increasing the mechanical stress therein. The welding current supply members are thus not subject to any mechanical stress other than their own weight. The assurance of better contacts at the joints in the electrical conducting members provided by the invention reduces the amount of heat due to contact resistance. Since the shoulders on the supporting flanges of the collars positively lock the rims and shoes, pressure on the electrode will not develop any eccentricity in the latter which would cause looseness at the compact joints. The cooling of the electrode, if necessary, may be readily effected by the system described. Wearing parts, such as the supply conductor terminals and the electrode rims, have renewable shoes. While such shoes have been shown only in Figure 4, they may obviously be applied to all the different types of construction disclosed herein. Positive contact radially and axially between rims and shoes is assured at all times. If desired, the tie bolts securing the assembled electrodes together may be provided with springs to permit a slight expansion as a result of heating. In the case of the structure of Figure 1, the springs would be disposed on the bolts 20 between the keys 23 and the flange 22. The shrouds embracing the electrode rims prevent any flow of the metal when subjected to severe usage. Any loosening of the joints is thus precluded.

While I have illustrated and described herein only certain preferred embodiments of the invention, it will be recognized that many changes in the constructions disclosed could be made without departing from the spirit of the invention or the scope of the appended claims.

I claim:

1. In a welding electrode, the combination with a pair of annular conducting rims disposed side by side on a shaft for rotation, and bracing and supporting means on opposite sides of the electrode engaging both said rims laterally.

2. An electrode construction comprising a pair of conducting discs disposed side by side, a pair of rims removably positioned on said discs and adapted for removal sidewise therefrom, a shaft for rotatably supporting the discs and rims, and means on the shaft for holding the rims on the discs.

3. In a welding electrode, a hub, annular members secured together but insulated from each other mounted thereon and removable therefrom as a unit by axial shifting in the same direction, bracing means on both sides of the hub laterally supporting said members, and quick detachable means extending through said members and said bracing means for holding said rims against such axial shifting.

4. In a welding electrode, a pair of rims, means for supporting said rims in spaced relation to a rotating shaft, and terminals carried on the shaft for rotation therewith, spaced circumferentially thereabout, and adapted to engage said rims.

5. The apparatus defined by claim 4 wherein said terminals are conducting blocks pressed against said rims.

6. The apparatus defined by claim 4 characterized by means limiting the movement of said terminals on movement of said rims axially of said shaft.

7. An electrode comprising a hub adapted to be mounted on a shaft, conducting rims seated on said hub, said rims having alternating portions spaced circumferentially about said hub, terminals having face-to-face engagement with said portions, and means for supporting said terminals in close contact with said portions.

8. A welding electrode comprising a pair of conducting rims, one of said rims having projections extending axially through the other, terminal blocks adapted to engage projections of said one of said rims and the intermediate portions of the other rim, and means for supporting said terminals in close contact with said projections and rim.

9. A welding electrode comprising a hub adapted to be mounted on a shaft for rotation, a pair of conducting rims seated on said hub, a collar on said hub laterally supporting said rims on one side, a second hub adapted to be mounted on said shaft for laterally supporting said rims on the other side, terminal blocks carried by said second hub adapted to have conducting engagement with portions of said rims, and means for urging said terminal blocks against said rims.

10. A welding electrode comprising a pair of conducting rims mounted on a shaft for rotation therewith, conductors extending along said shaft, terminals laterally engaging said rims, flexible connections between said conductors and said terminals, and means for urging said terminals against said rims.

11. The combination with a welding electrode having a hollow interior, and means mounting said electrode for rotation, of a stationary annular housing disposed adjacent said electrode, and means rotating with said electrode for delivering coolant from said housing to the electrode and returning it thereto.

12. Cooling apparatus for a rotatable electrode comprising an annular housing disposed adjacent the electrode, a hollow wheel rim rotating with said electrode and supported on hollow spokes communicating with the interior of the rim, said wheel rim being mounted within said chamber, and connections from the spokes to the interior of the electrode effective to deliver thereto coolant from said chamber.

13. In combination with a rotary electrode, of cooling means for delivering a coolant to the interior of the electrode and collecting it therefrom, including an annular chamber adjacent the electrode, and means rotating therein with the electrode for lifting coolant from the lower part of the chamber and delivering it to said electrode.

14. A welding electrode comprising annular members disposed side by side and insulated from each other, contact shoes removably positioned on said members, shoulders extending laterally from the shoes, and means engaging the shoulders for holding the shoes against radial movement from said members.

15. A welding electrode comprising annular members disposed side by side on a shaft and insulated from each other and the shaft, current supply means electrically connected with said members, and holding means on said shaft independent of said current supply means, said holding means engaging said members and adapted to transmit to the shaft the mechanical stress to which the members are subject.

16. A welding electrode comprising a pair of annular members of different diameters disposed side by side on a shaft for rotation therewith, a pair of rims adapted to fit on said members so that each engages only one member, said rims being secured together for removal as a unit but insulated from each other, and quick detachable means for holding the rims on the members including bolts extending through both the rims and one of the members.

17. A welding electrode comprising a pair of annular members, a shaft, a hub on the shaft supporting the members, a collar on the hub supporting one side of the electrode and a hub on the shaft supporting the other side of the electrode.

18. The apparatus defined by claim 1 characterized by said bracing and supporting means having space therein for the circulation of cooling fluid therethrough.

19. In an electrode, a pair of annular conducting members disposed side by side, contact rings engaging said members, bridging means engaging both said members and said rings, and means for holding said parts together in assembled relation.

20. A welding electrode comprising a pair of discs insulated from each other, a pair of rings having radial engagement with said discs respectively, and a pair of rings bridging the joints between said discs and said first-mentioned rings.

21. A welding electrode comprising a pair of conducting rings mounted on a shaft for rotation therewith, conductors extending along said shaft, one end of said conductors being in electric-conducting engagement with the electrode, the other end of said conductors being connected to a current source, a rotatable bearing supporting said conductors between the source and the electrode, and means whereby said conductors may be disconnected from said source and moved axially through the bearing.

JAMES V. CAPUTO.